United States Patent
Frota de Souza Filho et al.

(10) Patent No.: US 10,124,424 B2
(45) Date of Patent: Nov. 13, 2018

(54) ROTARY CUTTING TOOL WITH INTERNAL BALANCING FEATURE

(71) Applicant: Kennametal Inc., Latrobe, PA (US)

(72) Inventors: Ruy Frota de Souza Filho, Latrobe, PA (US); Sebastian Schleicher, Füerth (DE)

(73) Assignee: KENNAMETAL INC., Latrobe, PA (US)

( * ) Notice: Subject to any disclaimer, the term of this patent is extended or adjusted under 35 U.S.C. 154(b) by 236 days.

(21) Appl. No.: 14/993,959

(22) Filed: Jan. 12, 2016

(65) Prior Publication Data

US 2017/0197258 A1 Jul. 13, 2017

(51) Int. Cl.
| | | |
|---|---|---|
| B23C 5/10 | (2006.01) | |
| B23C 5/16 | (2006.01) | |
| B23B 29/02 | (2006.01) | |
| B23C 5/06 | (2006.01) | |

(52) U.S. Cl.
CPC ............. B23C 5/16 (2013.01); B23B 29/02 (2013.01); B23C 5/06 (2013.01); *B23B 2250/04* (2013.01); *B23B 2260/056* (2013.01); *B23C 2250/04* (2013.01); *B23C 2260/28* (2013.01)

(58) Field of Classification Search
CPC ............ B23Q 11/0035; B23Q 11/0032; B23B 2250/16; B23B 2250/04
See application file for complete search history.

(56) References Cited

U.S. PATENT DOCUMENTS

| | | | | |
|---|---|---|---|---|
| 3,447,402 A | * | 6/1969 | Ray | B23B 29/022 408/143 |
| 4,040,315 A | * | 8/1977 | Bellingham | B23B 29/03492 82/131 |
| 5,096,345 A | | 3/1992 | Toyomoto | |
| 5,263,995 A | | 11/1993 | Mogilnicki et al. | |
| 6,045,308 A | | 4/2000 | Frank et al. | |
| 6,341,600 B1 | * | 1/2002 | Wakita | B23D 61/10 125/13.01 |
| 6,471,453 B1 | | 10/2002 | Wiinebrenner et al. | |
| 6,537,000 B1 | * | 3/2003 | Weck | B23B 31/08 279/16 |
| 6,719,503 B1 | * | 4/2004 | McCalmont | B23Q 11/0035 188/378 |
| 2003/0228199 A1 | * | 12/2003 | Matsumoto | B23B 31/006 409/141 |
| 2007/0028716 A1 | * | 2/2007 | Kawai | B23Q 11/0035 74/574.2 |
| 2008/0080942 A1 | | 4/2008 | Chen | |

(Continued)

*Primary Examiner* — Will Fridie, Jr.
(74) *Attorney, Agent, or Firm* — Larry R. Meenan

(57) ABSTRACT

A rotary cutting tool has a central, longitudinal axis. One or more internal balancing features are disposed within a cavity of the rotary cutting tool. Each internal balancing feature includes a balancing mass suspended within the cavity by a spring-like element, and an adjusting screw for effecting radial movement of the balancing mass. Each internal balancing feature can be integrally-formed with the rotary cutting tool using a 3-D printing technique. The rotary cutting tool can be any rotary cutting tool, such as a milling cutter, a boring bar, and the like. The internal balancing features are arranged at predetermined locations within the rotary cutting tool to enable static and/or dynamic balancing of the rotary cutting tool.

23 Claims, 5 Drawing Sheets

(56) References Cited

U.S. PATENT DOCUMENTS

2008/0191429 A1* 8/2008 Tugend ............ B23B 29/03414
                                                    279/30
2010/0061818 A1* 3/2010 Lohner ............ B23B 29/03407
                                                    408/143

* cited by examiner

ROTARY CUTTING TOOL WITH INTERNAL BALANCING FEATURE

BACKGROUND OF THE INVENTION

Balancing of a rotary cutting tool is often times achieved with material removal (drilling holes or milling flats), repositioning of mass (balancing rings, counterweights) or adjusting setscrews. Removing material can only be done a few times before the toolholder must be replaced. Balancing rings add cost and have limited balancing capacity and accuracy. Adjusting setscrews can be accurate, but have minimal balancing capacity.

SUMMARY OF THE INVENTION

The problem of balancing a rotary cutting tool is solved by providing one or more internal balancing features comprising a balancing mass suspended within an internal cavity by a spring-like element, and an adjusting screw for effecting radial movement of the balancing mass, wherein the internal balancing feature is integrally-formed with the body of the rotary cutting tool.

In one aspect, a rotary cutting tool comprises a first toolholder and a first internal balancing feature disposed within a cavity of the first toolholder. The first internal balancing feature comprises a balancing mass suspended within the cavity by a spring-like element, and an adjusting screw for effecting radial movement of the balancing mass. The first internal balancing feature is integrally-formed with the first toolholder of the rotary cutting tool.

In another aspect, a rotary cutting tool comprises a first toolholder, a second toolholder attached to the first toolholder, and a first internal balancing feature disposed within a cavity of one of the first and second toolholders. The first internal balancing feature comprises a balancing mass suspended within a cavity by a spring-like element, and an adjusting screw for effecting radial movement of the balancing mass.

In yet another aspect, a rotary cutting tool comprises a first toolholder, a second toolholder attached to the first toolholder by an intermediate toolholder, and a first internal balancing feature disposed within a cavity of one of the first, second and intermediate toolholders. The first internal balancing feature comprises a balancing mass suspended within a cavity by a spring-like element, and an adjusting screw for effecting radial movement of the balancing mass.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
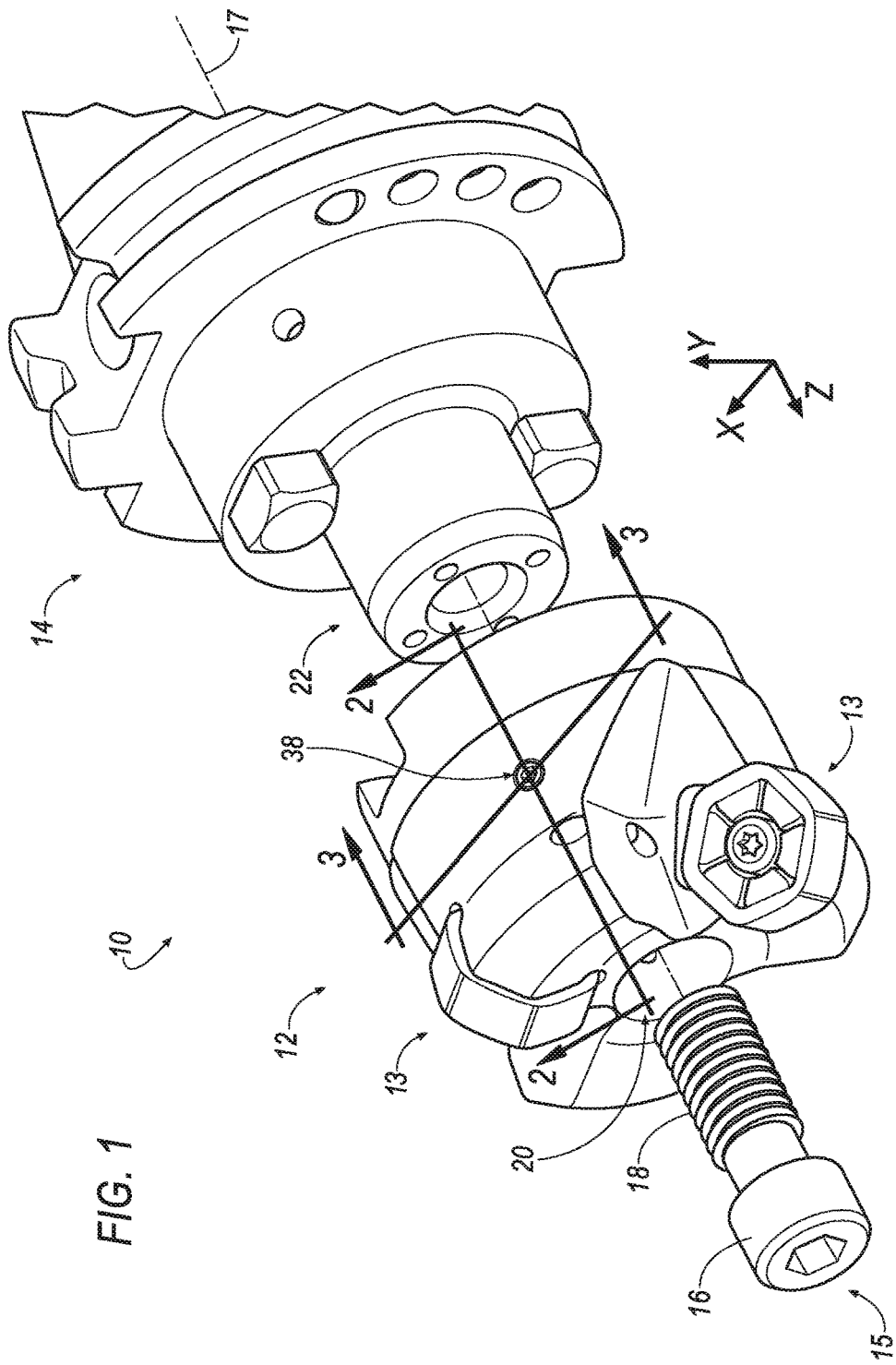
FIG. 1 is a partial perspective view of a rotary cutting tool including a first toolholder, such as a milling cutter, with an internal balancing feature according to an exemplary embodiment of the invention.

Referring to FIG. 1, wherein like reference characters represent like elements, a rotary cutting tool 10 is shown according to an embodiment of the invention. In general, the rotary cutting tool 10 comprises a first toolholder 12 with at least one cutting insert 13 mounted thereon, a second toolholder 14 and a fastener 15 for attaching the first toolholder 12 to the second toolholder 14. The milling cutter 10 includes a central, longitudinal axis (i.e., z-axis) 17. The central, longitudinal axis 17 is generally the rotational axis of the milling cutter 10. The fastener 15 includes a head portion 16 and a threaded portion 18. It is understood that the first toolholder 12 has threads 20 to allow the fastener 15 to be threaded into the first toolholder 12. It is also understood that the first toolholder 12 can be placed on a pilot 22 of the second toolholder 14 and threaded into the second toolholder 14 to draw the milling cutter first toolholder 12 onto the second toolholder 14.

In the illustrated embodiment, the first toolholder 12 comprises a milling cutter and the second toolholder 14 comprises a tapered adapter. However, it will be appreciated that the principles of the invention can be applied to any type of rotary cutting tool, such as a boring bar, drill, and the like.

Figure 2:
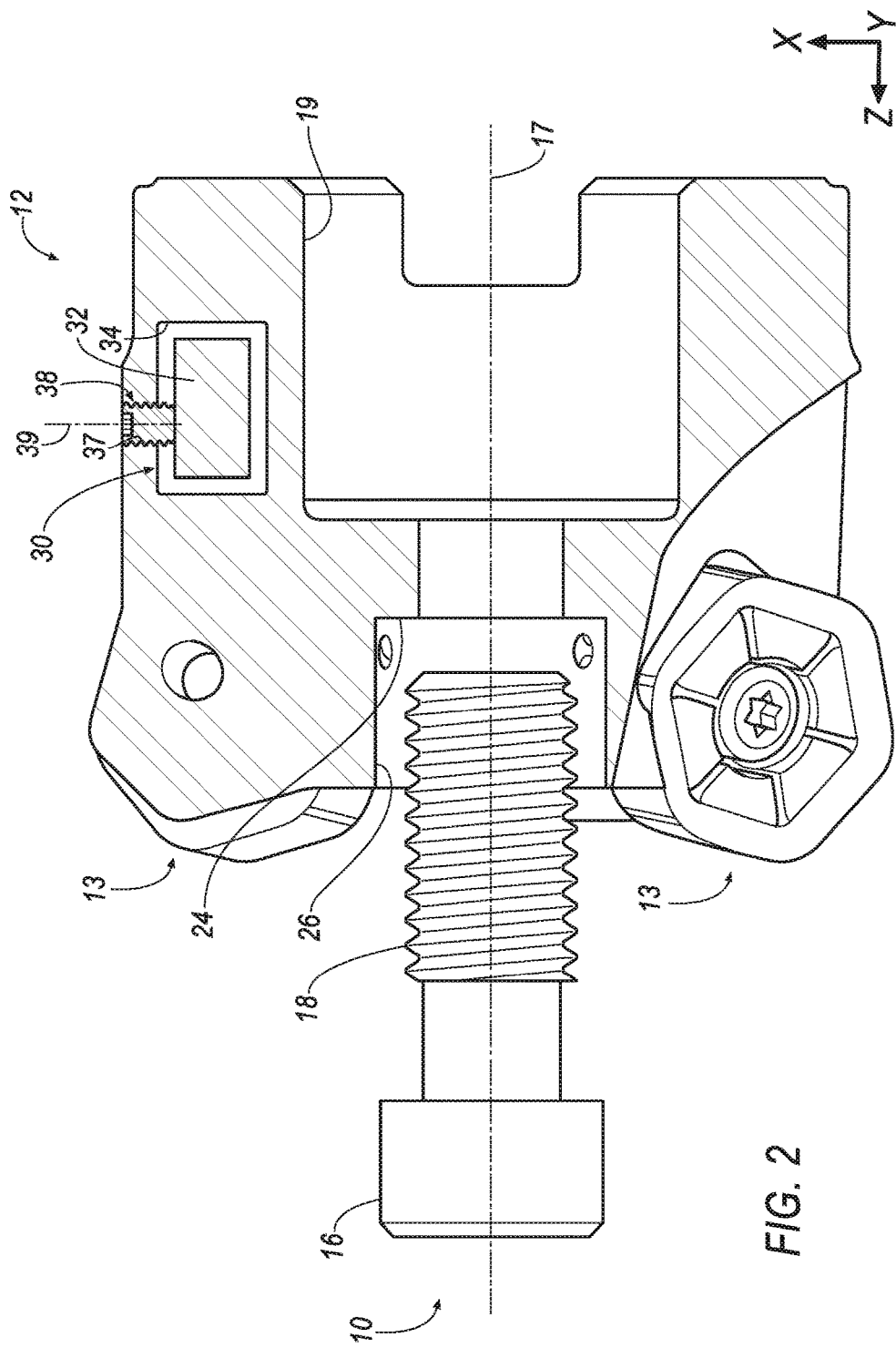
FIG. 2 is a cross-sectional view of the first toolholder with the internal balancing feature taken along line 2-2 of FIG. 1.

Referring now to FIG. 2, the first toolholder 12 can be installed to the second toolholder (14) by inserting the pilot 22 into a bore 19 of the first toolholder 12 and threading the fastener 15 into the first toolholder 12 such that the fastener 10 moves in the direction along the central, longitudinal axis 17. Then, the fastener 15 is threaded completely through the first toolholder 12 until the head portion 16 contacts a seating surface 24 in a counter bore 26 of the first toolholder 12. At this point, the first toolholder 12 is securely attached to the second toolholder 14. However, there is an inherent unbalance of the milling cutter 10 when the first toolholder 12 is attached to the second toolholder 14 because a small gap exists between the pilot 22 and the bore 19 of the first toolholder 12 of the milling cutter 10.

Figure 3:
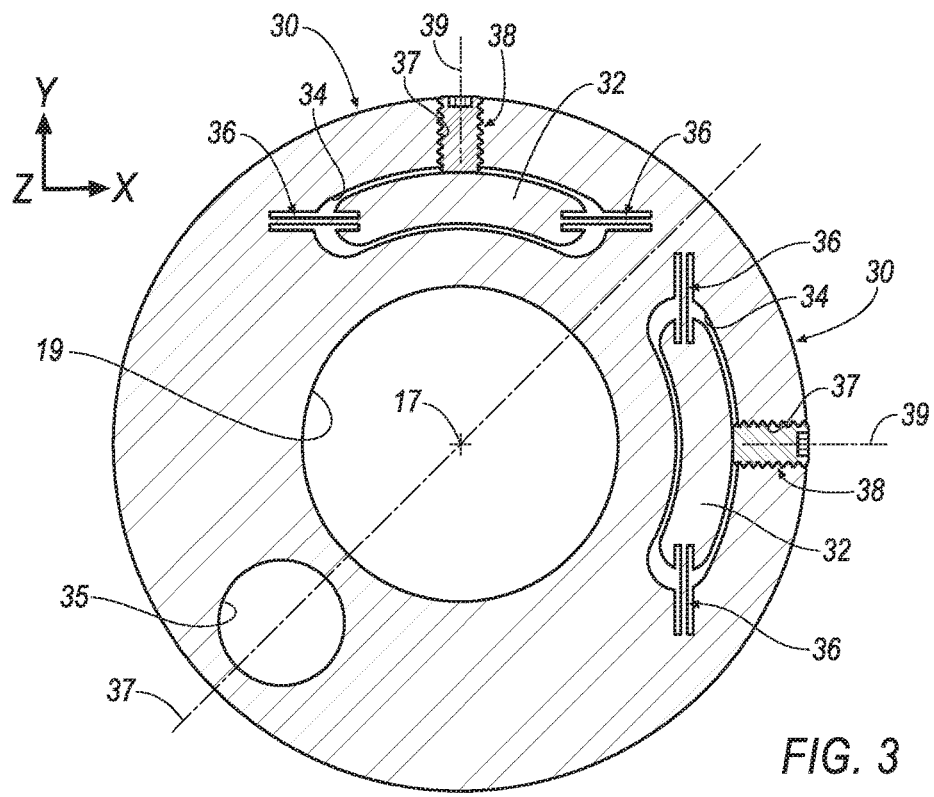
FIG. 3 is a cross-sectional view of the first toolholder with the internal balancing feature taken along line 3-3 of FIG. 1.

Referring now to FIGS. 2 and 3, one aspect of the invention is that the first toolholder 12 and/or the second toolholder (14) includes one or more internal balancing features, shown generally at 30, according to an embodiment of the invention. Each balancing feature 30 comprises a balancing mass 32 suspended within an internal cavity 34 by spring-like elements 36. The balancing feature 30 further comprises an adjustment element, such as an adjusting screw 38 for selectively adjusting the radial position (i.e., x-axis position) of the balancing mass 32. The adjusting screw 38 has a central axis 39 that is generally perpendicular to the central, longitudinal axis 17 (i.e., z-axis) of the milling cutter 10 (i.e., parallel to the x-axis). However, it should be noted that it is not necessary that the central axis 39 of the adjusting screw 38 be generally perpendicular to the axis 17, and that the central axis 39 of the adjusting screw 38 can be positioned at non-perpendicular angle. As a result of the non-perpendicular angle, a finer balancing adjustment of the rotary cutting tool 10 would be produced because a portion of the displacement of the adjusting screw 38 would cause a radial displacement of the balancing mass 32.

The balancing mass 32 and the spring-like elements 36 of the internal balancing feature 30 can be manufactured by using well-known 3-D printing techniques to produce a single piece component that is integrally-formed with the first toolholder 12. The internal balancing feature 30 can be made of the same material as the first toolholder 12, such as tool steel, and the like, or can be made of a different suitable material. Any excess material from the 3-D printing process can be removed through a threaded aperture 37 for the adjusting screw 38. The 3-D printing technique allows the balancing mass 32 and spring-like elements 36 of the balancing feature 30 to be totally encapsulated within the cavity 34 of the first toolholder 12 of the milling cutter 10.

It should be noted that the balancing mass 32 is pre-loaded against the adjusting screw 38 prior to balancing the assembled milling cutter 10. This pre-loaded condition provides several advantages. First, the pressure exerted by the balancing mass 32 against the adjusting screw 38 due to the pre-loaded condition allows the adjusting screw 38 to minimize movement of the balancing mass 32 in the direction of the central, longitudinal axis 17 (i.e., the z-axis). Second, the pressure exerted by the balancing mass 32 against the adjusting screw 38 prevents the adjusting screw 38 from moving due to vibration of the milling cutter 10. Third, the pre-loaded condition allows the adjusting screw 38 to displace the balancing mass 32 in both the radially inward and outward directions (i.e., along the x-axis) by rotating the adjusting screw 38 in both the clockwise and counter-clockwise directions, thereby allowing balancing of the milling cutter 10 in both radial directions.

It should also be noted that the spring-like elements 36 of the balancing feature 30 can be any desirable shape that suspends the balancing mass 32 within the cavity 34, while allowing for movement of the balancing mass 32 in both the radially inward and outward directions. For example, the spring-like elements 36 can comprise a cantilever-type member that allows movement of the balancing mass 32 in the radial direction, but inhibits movement of the balancing mass 32 in the axial direction (i.e. along the z-axis). In one embodiment, the spring-like element 36 may comprises a serpentine shape, an S-shape, and the like. The desired shape of the spring-like element 36 has only recently been made possible by the 3-D printing technique, which can integrally-form the spring-like element 36 with the first toolholder 12 and the balancing mass 32, while being completely encapsulated within the cavity 34 of the first toolholder 12.

As shown in FIG. 3, a second balancing feature 30 is located approximately ninety (90) degrees from the balancing feature 30 shown in FIG. 2. The second balancing feature 30 is located in the same Z-plane that is substantially perpendicular to the central, longitudinal axis 17 (i.e. rotational axis) of the milling cutter 10. In the illustrated embodiment, the second balancing feature 30 is substantially identical to the balancing feature 30 shown in FIG. 2. Because the second balancing feature 90 is spaced ninety (90) degrees apart from the balancing feature 30 shown in FIG. 2, the adjusting screw 38 of the second balancing feature 30 moves the balancing mass 32 in a radially inward and outward in the y-axis direction, as compared to the x-axis direction for the balancing feature 30 shown in FIG. 2. As shown in FIG. 3, the arrangement of two balancing features 30 in the first toolholder 12 comprises a first set of balancing features that provides two degrees of freedom to enable static (i.e. single plane) balancing of the milling cutter 10 in any direction.

In addition, the first toolholder 12 may include another cavity 35 located diagonally opposite the first and second balancing features 30 to balance the first toolholder 12 by design. The additional cavity 35 can be made by using 3-D printing techniques with dimensions that compensate for the void areas created between the first and second balancing features 30 and their respective cavity 34. The cavity 35 can also compensate for any other unbalance of the first toolholder 12 that is created by any other feature of the first toolholder 12. In the illustrated embodiment, the cavity 35 is centrally located along a bisector 37 between the first and second balancing features 30 and passing through the central axis 17. It should be noted that the invention is not limited by the number of cavities 35, and that the invention can be practiced with any desirable number of cavities 35 to balance the first toolholder 12 by design.

Figure 4A:
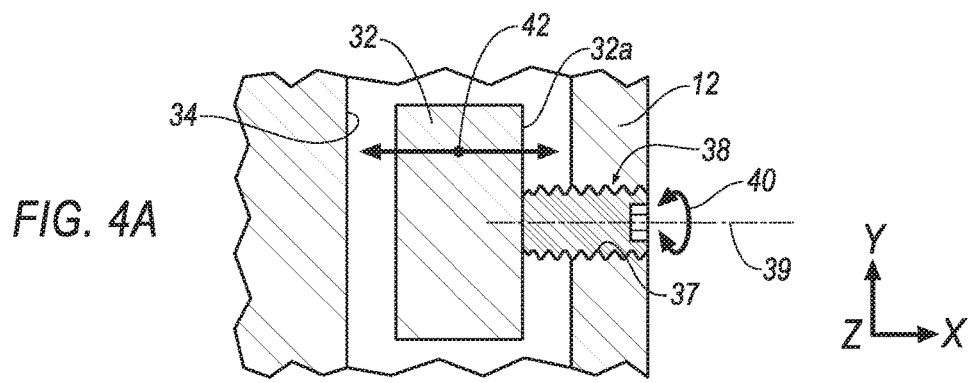
FIG. 4A is an enlarged cross-sectional view of the internal balancing feature with a single threaded adjusting screw according to an embodiment of the invention.

Referring now to FIG. 4(a), the adjusting screw 38 comprises a single-threaded screw that is threaded into the threaded aperture 37 of the first toolholder 12 and into the cavity 34 to engage a radially-outward surface 32a of the balancing mass 32. Once engaged with the balancing mass 32, the adjusting screw 38 is rotated in the clockwise or counter-clockwise direction, as indicated by the arrow 40, to move the balancing mass 32 in the radially inward or radially outward direction (i.e. along the x-axis or y-axis), as indicated by the arrow 42.

Figure 4B:
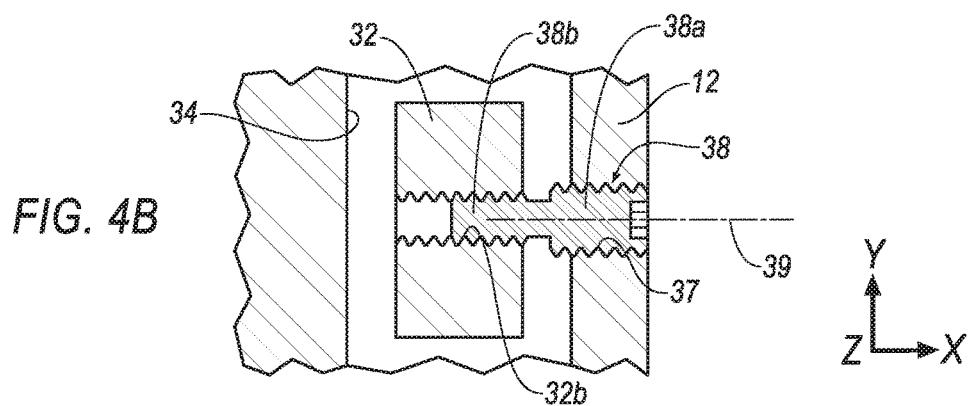
FIG. 4B is an enlarged cross-sectional view of the internal balancing feature with a double threaded adjusting screw according to an embodiment of the invention.

FIG. 4(b) shows another embodiment of the adjusting screw 38 for moving the balancing mass 32 in the radially inward or radially outward direction. In this embodiment, the adjusting screw 38 comprises a differential adjusting screw having two different thread pitches at opposite ends of the adjusting screw 38. Specifically, one end 38a has a first thread pitch for threading the adjusting screw 38 into the first toolholder 12, while the opposite end 38b has a second thread pitch for threading the adjusting screw 38 into a threaded aperture 32b of the balancing mass 32. Because of the difference in the pitches, the amount of movement of the balancing mass 32 by rotation of the adjusting screw 32 can be selectively adjusted to finely tune the balancing mass 32.

Figure 5:
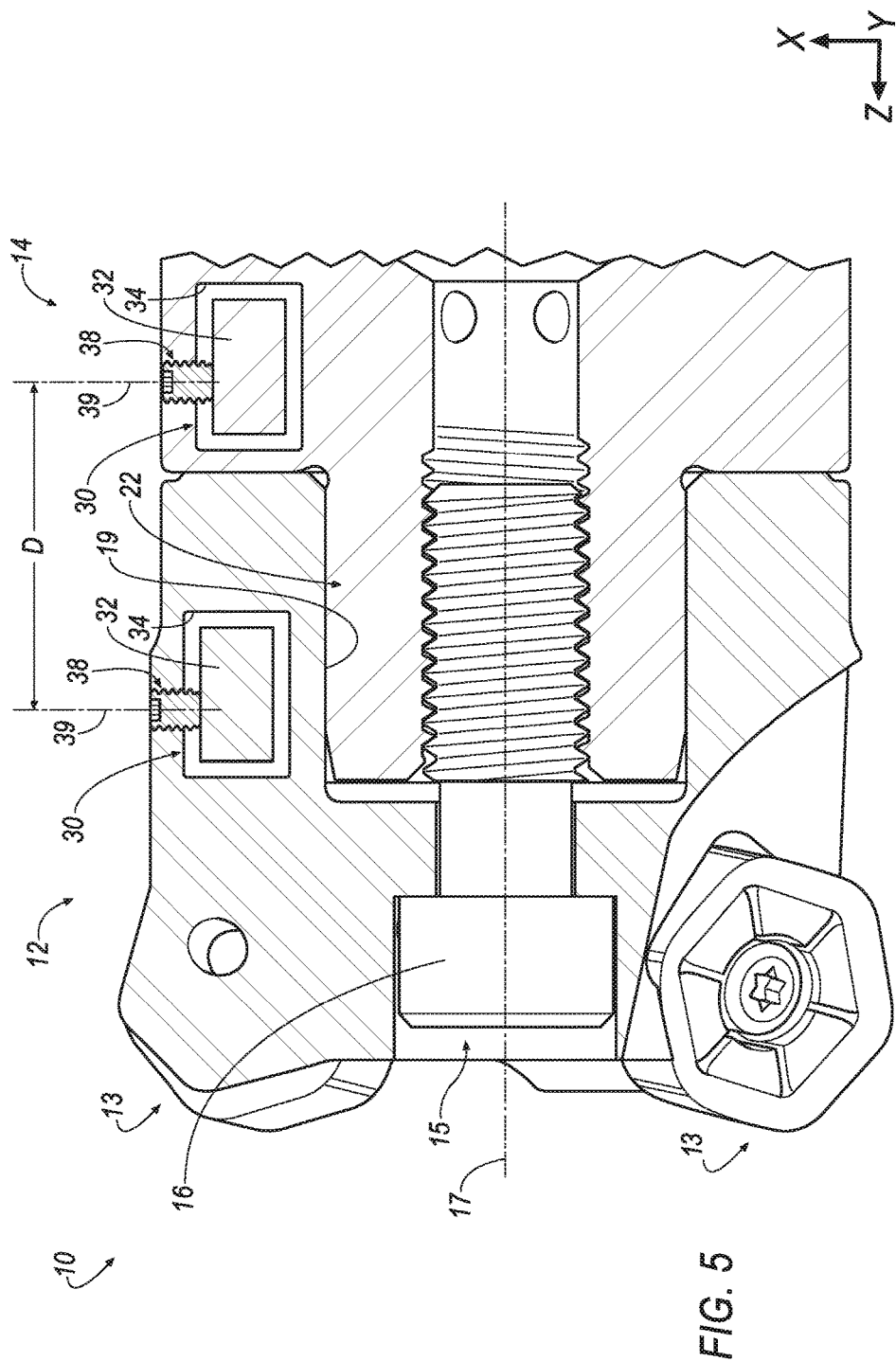
FIG. 5 is a cross-sectional view of the rotary cutting tool with two sets of internal balancing features, one set in the first toolholder and the second set in the second toolholder according to another embodiment of the invention.

As described above, a single set comprising two internal balancing features 30 positioned at approximate ninety (90) degrees apart from each other provides static (non-moving) balancing of the milling cutter 10. Referring now to FIG. 5, another embodiment of the invention is shown in which two sets of internal balancing features 30 are spaced apart from each other by a distance, D, along the central, longitudinal axis 17 (i.e., z-axis) of the rotary cutting tool 10. In other words, the two sets of balancing features 30 are located in different planes that are substantially perpendicular to the central, longitudinal axis 17 (i.e. rotational axis) of the milling cutter 10. This arrangement along the axial direction (i.e. along the z-axis) allows for dynamic balancing (dual plane) of the rotary cutting tool 10.

It will be appreciated that the illustrated rotary cutting tool 10 comprises a milling cutter. However, the important aspect of the invention is that the two sets of internal balancing features 30 are spaced apart from each other by the distance, D, along the central, longitudinal axis 17 of the toolholder 10. Thus, it should be appreciated that the principles of the invention can be applied to other types of rotary cutting tools, such as a boring bar, and the like. In this other embodiment, both two sets of internal balancing features 30 would be disposed within the body of the boring bar, rather than one set in the first toolholder 12 and another set in the second toolholder (14), as shown in the rotary cutting tool 10.

Similar to FIG. 3, it should be realized that each set of internal balancing features 30 also includes a second internal balancing feature 30 arranged approximately ninety (90) degrees apart from each other. The arrangement of two sets of balancing features 30 spaced apart along the central, longitudinal axis 17, each set comprising two balancing features 30 spaced approximately ninety (90) degrees apart from each other enables dynamic (i.e. moving) balancing of the milling cutter 10 in any direction.

As shown in FIG. 5, a first set of balancing features 30 are located in the first toolholder 12, while the second set of balancing features 30 are located in the second toolholder (14). However, it will be appreciated that the invention can be practiced with one internal balancing feature 30 located in the first toolholder 12 and/or the second toolholder (14), or a plurality of internal balancing features 30 located in the first toolholder 12 and/or second toolholder (14). In addition, any desirable number of cavities 35 may be sized and located in such a way to balance the first toolholder 12 and/or second toolholder (14) by design.

It will be appreciated that the principles of the invention can be applied to other configurations of the internal balancing features 30. For example, a set of internal balancing features 30 comprising three (3) internal balancing features can be spaced 120° apart from each other in the same plane that is perpendicular to the central, longitudinal axis 17. In another example, a set of internal balancing features 30 comprising five (5) internal balancing features can be spaced 72° apart from each other in the same plane that is perpendicular to the central, longitudinal axis 17. In yet another example, one set of internal balancing features 30 can be located in one plane along the central, longitudinal axis 17, and another set of internal balancing feature 30 can be located in a different plane along the central, longitudinal axis 17 and a different plane that is parallel to the central, longitudinal axis 17. As can been easily seen, a plurality of different configurations of the internal balancing features 30 are within the spirit and scope of the invention.

In the illustrated embodiment shown in FIGS. 1-5, the rotary cutting tool 10 comprises a milling cutter. As mentioned above, it will be appreciated that the principles of the invention can be applied to any type of rotary cutting tool, such as a boring bar, drill, face milling cutter, and the like.

Figure 6:
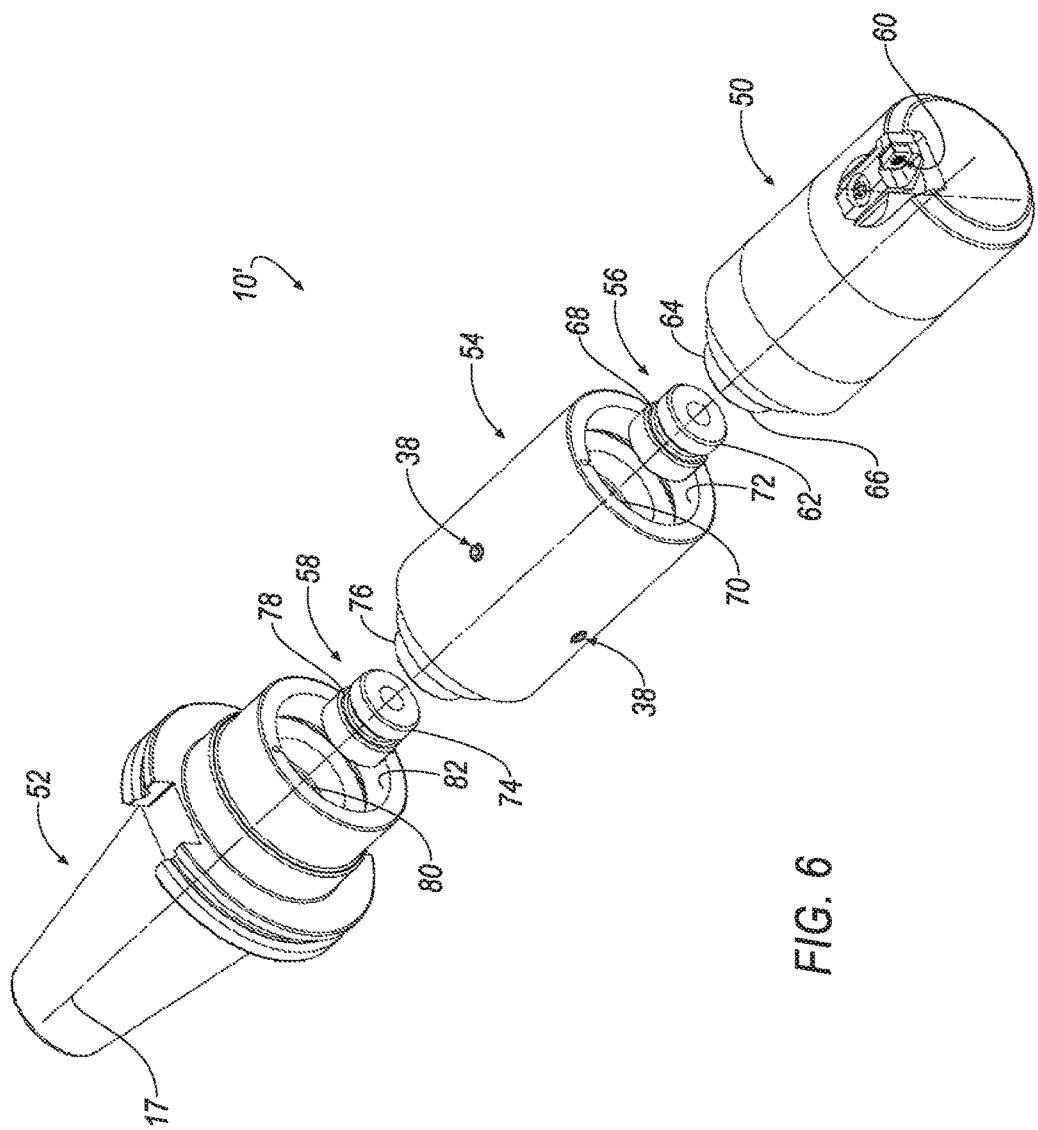
FIG. 6 is an exploded view showing a rotary cutting tool comprising multiple toolholders connected together using an extension coupling with the internal balancing feature according to an embodiment of the invention.

Referring now to FIG. 6, the rotary cutting tool 10' comprises a boring bar that includes a first toolholder 50, a second toolholder 52, and an intermediate toolholder, such as an extension coupling 54. A first connector 56 secures the first toolholder 50 to the extension coupling 54, and a second connector 58 secures the second toolholder 52 to the extension coupling 54. In the illustrated embodiment, the first toolholder 50 comprises a boring bar, while the second toolholder 52 comprises a tapered adapter. The first toolholder 50 includes at least one cutting insert 60 typically used for boring operations.

Threads 62 on the first connector 56 engage matching threads 64 within a bore 66 of the first toolholder 50, while threads 68 on the first connector 56 engage matching threads 70 within a bore 72 of the extension coupling 54. Similarly, threads 74 on the second connector 58 engage matching threads 76 within the bore 72 of the extension coupling 54, while threads 78 on the second connector 58 engage matching threads 80 within a bore 82 of the second toolholder 52. Once the threads are engaged, the first and second connectors 56, 58 can be rotated to draw the first and second toolholders 50, 52 into the extension coupling 54.

As can be seen in FIG. 6, the extension coupling 54 includes the adjusting screw 38 for a single set comprising two internal balancing features 30 positioned at approximate ninety (90) degrees apart from each other provides static (non-moving) balancing of the boring bar 10'. However, it will be appreciated that the first toolholder 50 and/or the second toolholder 52 may include a second set comprising two internal balancing features 30 positioned at approximate ninety (90) degrees apart from each other. The arrangement of two sets of balancing features 30 spaced apart along the central, longitudinal axis 17, each set comprising two balancing features 30 spaced approximately ninety (90) degrees apart from each other enables dynamic (i.e. moving) balancing of the boring bar 10' in any direction. For example, the first toolholder 50 of the boring bar 10' may include a second set comprising two internal balancing features 30 spaced ninety (90) degrees apart from each other. In another example, the second toolholder 52 of the boring bar 10' may include a second set comprising two internal balancing features 30 spaced ninety (90) degrees apart from each other. In yet another example, the first toolholder 50 of the boring bar 10' may include a second set comprising two internal balancing features 30 spaced ninety (90) degrees apart from each other, and the second toolholder 52 of the boring bar 10' may include a second set comprising two internal balancing features 30 spaced ninety (90) degrees apart from each other.

As described above, the internal balancing feature 30 in the invention is a single piece design that is precise and simple to use. The internal balancing feature 30 can also be applied in cases where large amounts of unbalance need to be compensated, such as shell mill cutters and adapters, and the like.

The patents and publications referred to herein are hereby incorporated by reference.

Having described presently preferred embodiments the invention may be otherwise embodied within the scope of the appended claims.

What is claimed is:

1. A rotary cutting tool having a central, longitudinal axis, comprising:
   a first toolholder;
   a first internal balancing feature disposed within a cavity of the first toolholder, the first internal balancing feature comprising a balancing mass suspended within the cavity by a spring-like element, and an adjusting screw for effecting radial movement of the balancing mass; and
   a second internal balancing feature disposed at a predetermined angular distance with respect to the first internal balancing feature and in a same plane as the first internal balancing feature, the plane being substantially perpendicular to the central, longitudinal axis of the rotary cutting tool,
   wherein the first and second balancing features comprise a combined set of balancing features that enables static balancing of the rotary cutting tool.

2. The rotary cutting tool according to claim 1, wherein the balancing mass is integrally-formed in a single piece with the first toolholder of the rotary cutting tool.

3. The rotary cutting tool according to claim 1, further comprising a third internal balancing feature disposed within a second toolholder of the rotary cutting tool at a distance, D, along the central, longitudinal axis with respect to the first internal balancing feature.

4. The rotary cutting tool according to claim 3, further comprising a fourth internal balancing feature disposed approximately ninety degrees with respect to the third internal balancing feature and in a same plane as the third internal balancing feature, the plane being substantially perpendicular to the central, longitudinal axis of the rotary cutting tool, wherein the third and fourth balancing features comprises a second set of balancing features that enables dynamic balancing of the rotary cutting tool.

5. The rotary cutting tool according to claim 3, wherein the second toolholder comprises a tapered adapter.

6. The rotary cutting tool according to claim 1, wherein the balancing mass is a 3-D printed component.

7. The rotary cutting tool according to claim 1, wherein the adjusting screw comprises a differential adjusting screw.

8. The rotary cutting tool according to claim 1, wherein the first toolholder comprises one of a milling cutter and a boring bar.

9. A rotary cutting tool having a central, longitudinal axis, comprising:
   a first toolholder;
   a second toolholder attached to the first toolholder; and
   a first internal balancing feature disposed within a cavity of one of the first and second toolholders, the first internal balancing feature comprising a balancing mass suspended within a cavity by a spring-like element, and an adjusting screw for effecting radial movement of the balancing mass; and
   a second internal balancing feature disposed at a predetermined angular distance with respect to the first internal balancing feature and in a same plane as the first internal balancing feature, the plane being substantially perpendicular to the central, longitudinal axis of the rotary cutting tool,
   wherein the first and second balancing features comprise a combined set of balancing features that enables static balancing of the rotary cutting tool.

10. The rotary cutting tool according to claim 9, wherein the balancing mass is integrally-formed in a single piece with the first toolholder of the rotary cutting tool.

11. The rotary cutting tool according to claim 9, further comprising a third internal balancing feature disposed within the rotary cutting tool at a distance along the central, longitudinal axis with respect to the first internal balancing feature.

12. The rotary cutting tool according to claim 11, further comprising a fourth internal balancing feature disposed approximately ninety degrees with respect to the third internal balancing feature and in a same plane as the third internal balancing feature, the plane being substantially perpendicular to the central, longitudinal axis of the rotary cutting tool, wherein the third and fourth balancing features comprises a second set of balancing features that enables dynamic balancing of the rotary cutting tool.

13. The rotary cutting tool according to claim 10, wherein the balancing mass and spring-like element comprises at least one 3-D printed component.

14. The rotary cutting tool according to claim 9, wherein the adjusting screw comprises a differential adjusting screw.

15. A rotary cutting tool having a central, longitudinal axis, comprising:
   a first toolholder;
   a second toolholder attached to the first toolholder by an intermediate toolholder and
   a first internal balancing feature disposed within a cavity of one of the first, second and intermediate toolholders, the first internal balancing feature comprising a balancing mass suspended within a cavity by a spring-like element, and an adjusting screw for effecting radial movement of the balancing mass; and
   a second internal balancing feature disposed at a predetermined angular distance with respect to the first internal balancing feature and in a same plane as the first internal balancing feature, the plane being substantially perpendicular to the central, longitudinal axis of the rotary cutting tool,
   wherein the first and second balancing features comprise a combined set of balancing features that enables static balancing of the rotary cutting tool.

16. The rotary cutting tool according to claim 15, wherein the balancing mass is integrally-formed in a single piece with the first toolholder of the rotary cutting tool.

17. The rotary cutting tool according to claim 16, further comprising a third internal balancing feature disposed within the rotary cutting tool at a distance along the central, longitudinal axis with respect to the first internal balancing feature.

18. The rotary cutting tool according to claim 17, further comprising a fourth internal balancing feature disposed approximately ninety degrees with respect to the third internal balancing feature and in a same plane as the third internal balancing feature, the plane being substantially perpendicular to the central, longitudinal axis of the rotary cutting tool, wherein the third and fourth balancing features comprises a second set of balancing features that enables dynamic balancing of the rotary cutting tool.

19. The rotary cutting tool according to claim 15, wherein the balancing feature mass and spring-like element comprise at least one 3-D printed component.

20. The rotary cutting tool according to claim 15, wherein the adjusting screw comprises a differential adjusting screw.

21. The rotary cutting tool according to claim 1, wherein the balancing mass and spring-like element are integrally-formed in a single piece with the first toolholder of the rotary cutting tool.

22. The rotary cutting tool according to claim 1, wherein the predetermined angular distance is approximately 90 degrees.

23. The rotary cutting tool according to claim 1, wherein the spring-like element is a 3-D printed component.

* * * * *